United States Patent
Hopf et al.

(10) Patent No.: US 9,036,256 B2
(45) Date of Patent: May 19, 2015

(54) DISPLAY UNIT HAVING A PROJECTION SCREEN FOR A HEAD-UP DISPLAY

(76) Inventors: Christian Hopf, Wetzlar (DE); Alexander Noel, Hungen-Nonnenroth (DE); Horst Rumpf, Herborn (DE)

( * ) Notice: Subject to any disclaimer, the term of this patent is extended or adjusted under 35 U.S.C. 154(b) by 0 days.

(21) Appl. No.: 13/824,833

(22) PCT Filed: Sep. 16, 2011

(86) PCT No.: PCT/EP2011/066068
§ 371 (c)(1),
(2), (4) Date: Aug. 22, 2013

(87) PCT Pub. No.: WO2012/035130
PCT Pub. Date: Mar. 22, 2012

(65) Prior Publication Data
US 2013/0321909 A1   Dec. 5, 2013

(30) Foreign Application Priority Data
Sep. 18, 2010 (DE) .......................... 10 2010 046 009

(51) Int. Cl.
| | |
|---|---|
| G02B 27/01 | (2006.01) |
| G03B 21/56 | (2006.01) |
| B60K 35/00 | (2006.01) |
| B60R 11/02 | (2006.01) |
| F16M 11/04 | (2006.01) |
| F16M 11/10 | (2006.01) |
| F16M 11/18 | (2006.01) |
| B60R 11/00 | (2006.01) |

(52) U.S. Cl.
CPC .............. *G03B 21/56* (2013.01); *B60K 35/00* (2013.01); *B60K 2350/2052* (2013.01); *B60R 11/0235* (2013.01); *B60R 2011/0005* (2013.01); *B60R 2011/0085* (2013.01); *B60R 2011/0092* (2013.01); *F16M 11/041* (2013.01); *F16M 11/10* (2013.01); *F16M 11/18* (2013.01); *G02B 27/0149* (2013.01); *G02B 2027/0156* (2013.01); *G02B 2027/0181* (2013.01)

(58) Field of Classification Search
CPC .............. G02B 2027/0181; B60R 2011/0005; B60R 2011/0085
USPC ...................................... 359/443, 461; 345/7
See application file for complete search history.

(56) References Cited

U.S. PATENT DOCUMENTS 2,685,817 A * 8/1954 Freeman ....................... 359/449
4,988,976 A    1/1991 Lu
(Continued)

FOREIGN PATENT DOCUMENTS

CN   101346253 A    1/2009
JP   H05026589 U    4/1993
(Continued)

OTHER PUBLICATIONS

International Search Report for application No. PCT/EP2011/066068 mailed Dec. 23, 2011.
(Continued)

*Primary Examiner* — Christopher Mahoney
(74) *Attorney, Agent, or Firm* — Fletcher Yoder, P.C.

(57) ABSTRACT

The invention relates to a display unit having a projection screen for a head-up display. The projection screen is mechanically coupled to a main element, which is detachably connected to a carrier element and/or a mounting.

19 Claims, 4 Drawing Sheets

(56) References Cited

U.S. PATENT DOCUMENTS

Figure 1:
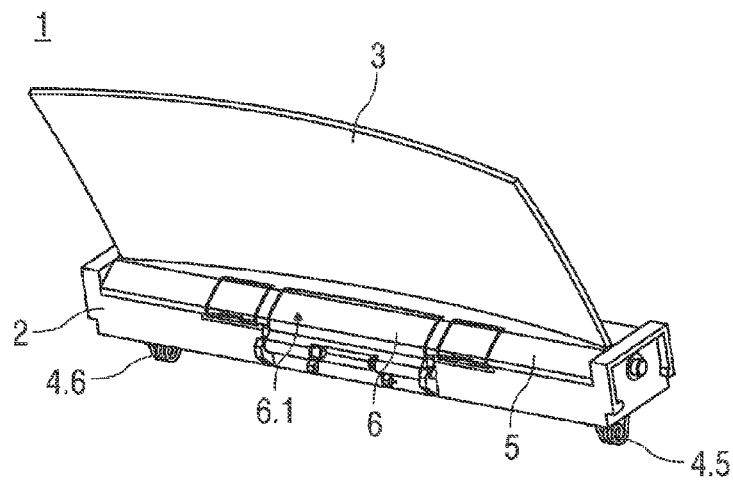

| | | | |
|---|---|---|---|
| 5,394,203 A | 2/1995 | Murphy et al. | |
| 5,457,575 A | 10/1995 | Groves et al. | |
| 5,905,477 A * | 5/1999 | Kuwayama et al. | 345/7 |
| 8,081,387 B2 * | 12/2011 | Montarou et al. | 359/632 |
| 2002/0167189 A1 | 11/2002 | Nakamura et al. | |
| 2009/0086329 A1 | 4/2009 | Potakowskyj et al. | |
| 2010/0046082 A1 * | 2/2010 | Croy et al. | 359/632 |
| 2011/0032612 A1 * | 2/2011 | Abe et al. | 359/461 |

FOREIGN PATENT DOCUMENTS

| | | |
|---|---|---|
| JP | 08-011580 | 1/1996 |
| JP | H08268114 A | 10/1996 |
| JP | H10082968 A | 3/1998 |
| JP | H10227991 A | 8/1998 |
| JP | H10268227 A | 10/1998 |
| JP | 11-352905 | 12/1999 |
| JP | 2004126450 A | 4/2004 |
| JP | 2010525987 A | 7/2010 |

OTHER PUBLICATIONS

Japanese Office Action dated Mar. 18, 2014.

Korean Office Action dated Mar. 3, 2014.

Chinese Office Action dated Jun. 30, 2014.

* cited by examiner

DISPLAY UNIT HAVING A PROJECTION SCREEN FOR A HEAD-UP DISPLAY

CROSS REFERENCE TO RELATED APPLICATIONS

This application claims priority from and the benefit of PCT Application No. PCT/EP2011/066068, filed on Sep. 16, 2011; and German Patent DE 10 2010 046 009.5, filed on Sep. 18, 2010, which are herein incorporated by reference.

BACKGROUND

The invention relates to a display unit having a projection screen for a head-up display in accordance with the features of the preamble of claim 1.

Head-up displays of this type are generally known from the prior art and comprise a display unit having a projection screen, onto which vehicle information is projected by means of an image-producing unit and optionally by means of an optical module. Here, the projection screen is of transparent configuration and is arranged in the field of vision of the vehicle driver.

The projection screens are subjected to high mechanical and thermal loads which are caused by high temperatures, sunlight and scratch marks. Said components therefore as a rule have to be replaced multiple times during the service life of a vehicle.

In the arrangements which are known in the prior art, the entire display unit has to be replaced in the event of a damaged projection screen.

JP 2004 41 26 450 A1 describes an arrangement, in which a projection screen can be pivoted from the windshield into a protected position with the aid of an articulated lever arrangement. Although the service life of the projection surface can be increased in this way, the entire arrangement, that is to say the entire display unit, has to be dismantled during the replacement of said projection surface.

SUMMARY

The invention is based on the object of specifying an improved display unit having a projection screen for a head-up display.

With regard to the display unit, the object is achieved according to the invention by a display unit having a projection screen for a head-up display having the features of claim 1.

Preferred refinements and developments of the invention are specified in the dependent claims.

According to the invention, in the case of the display unit having a projection screen for a head-up display, the projection screen is coupled mechanically to a base element which is connected releasably to a carrier element and/or a holder. Here, the positively locking and/or nonpositive connection between the holder and the carrier element can advantageously be released without tools. As a result, simple release of the projection screen from the carrier element and therefore simple replacing of a projection screen which is to be exchanged or is repaired are made possible.

In the case of a defect of the projection screen, the entire display unit particularly advantageously does not have to be replaced as is the case conventionally, but rather the defective component can be replaced in a simple way.

Furthermore, in addition to the simple release of the projection screen from the carrier element, it is particularly advantageous that the optical surface of the projection screen is not deformed during release because the base element remains on said projection screen.

In order to release the connection between the holder and the carrier element, an actuating apparatus is preferably arranged in the carrier element. As a result, the actuating apparatus can be reached particularly easily by the vehicle user.

At the ends of the carrier element, the holder advantageously has in each case two hook elements which can be pivoted with respect to one another, the hook elements being configured as identical parts. Here, the hook elements preferably in each case have a fastening pin which is configured as a rotational pin and by means of which said hook elements in each case engage into a cutout, corresponding to said fastening pin, within the carrier element.

On both end sides, the base element expediently has holding pins which correspond in each case to the hook elements, the hook elements engaging around the respective holding pins in the closed state, the base element being supported on the upper side of the carrier element.

The hook elements of in each case one side of the carrier element are advantageously coupled to one another by way of a spring element, the spring elements being configured in each case as helical springs, the spring elements being connected to the hook elements in such a way that spring forces act in the lower region of the hook elements to the outside, in each case in the opposite direction. Reliable holding of the projection screen on the carrier element can therefore be realized, with the result that the projection screen is protected against jolts, vibrations and oscillations during the operation of the vehicle.

The actuating apparatus expediently comprises an operating unit and a shaft, the operating unit being fastened pivotably to the carrier element, and the shaft extending over an entire length within the carrier element and being mounted on the end side in each case in a pivotable or rotatable manner in cutouts in the carrier element which correspond with the shaft.

In one advantageous embodiment, in each case one actuating element is arranged on the shaft on the end side, which actuating element is operatively connected to the hook elements in such a way that a rotation of the actuating elements brings about a pivoting movement of the respective hook elements.

Furthermore, the actuating elements are operatively connected to the base element and engage into guides which are arranged on an underside of the base element, with the result that, after the release of the positively locking and/or non-positive connection between the hook elements and the holding pins, the base element can be moved upward out of the carrier element.

In a further advantageous embodiment, in each case one spring element is arranged at both ends of the carrier element, which spring element acts on the base element. As a result, even after an actuation of the operating unit, sudden and uncontrolled release of the base element from the carrier element and therefore damage of the projection screen, for example by falling down, are avoided.

In each case one opening which can be closed in each case by means of a pivotable flap is particularly advantageously arranged on both sides of a cutout for the operating unit in the base element. As a result, a vehicle user can reach with one or more fingers into the openings and reliably grip and hold the base element and the projection screen. Here, direct contact of the projection screen by the vehicle user during the mounting and resulting damage and/or soiling can advantageously be avoided.

DRAWINGS

Figure 2:
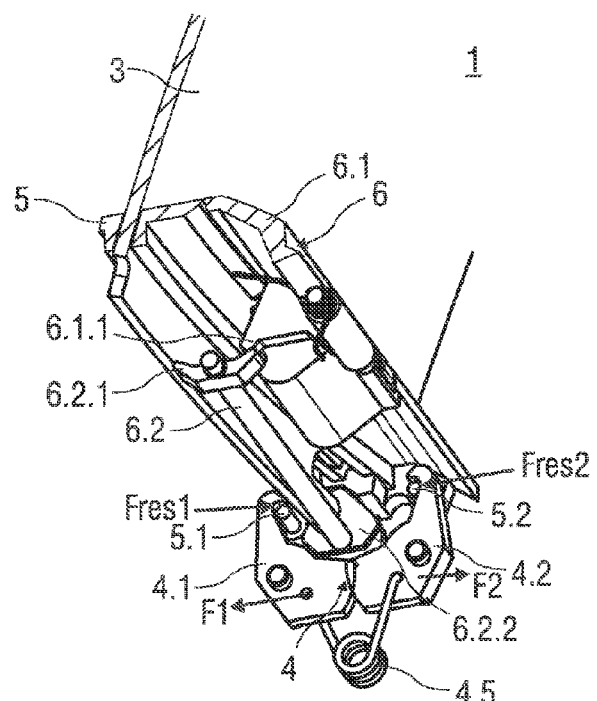
Figure 3:
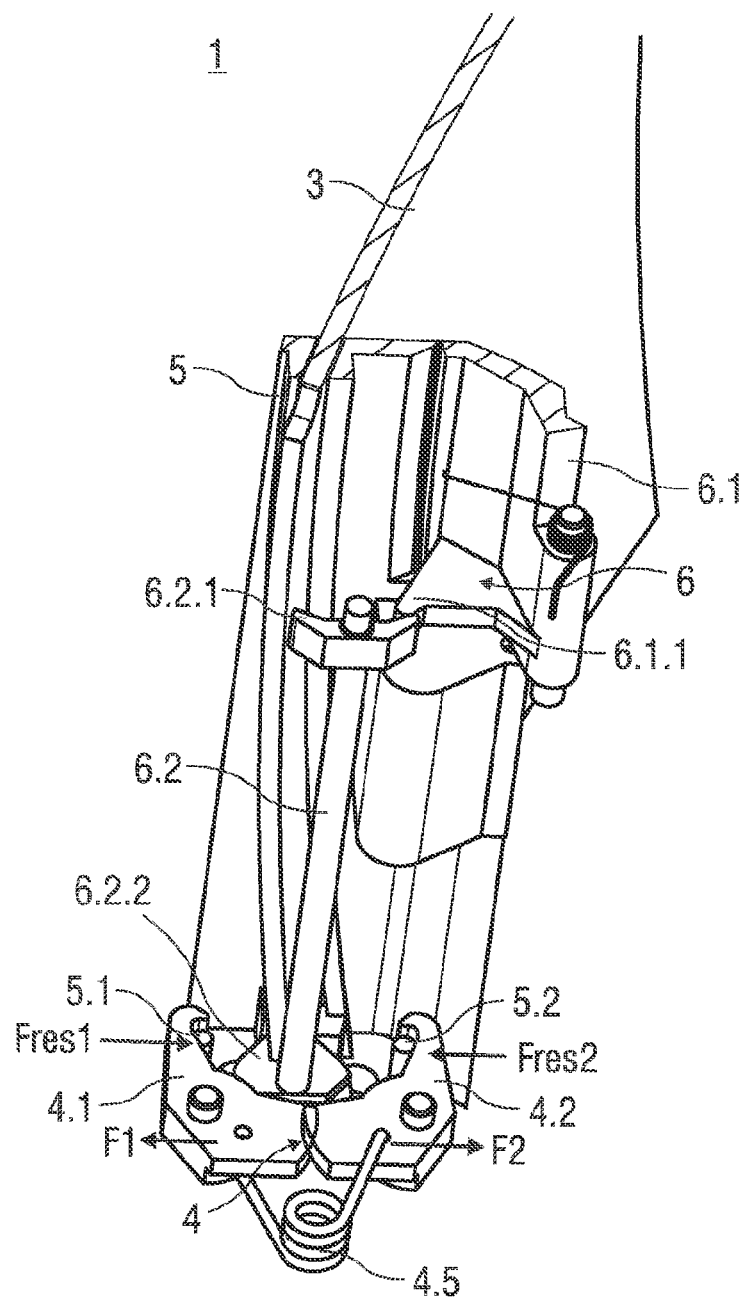
Figure 4:
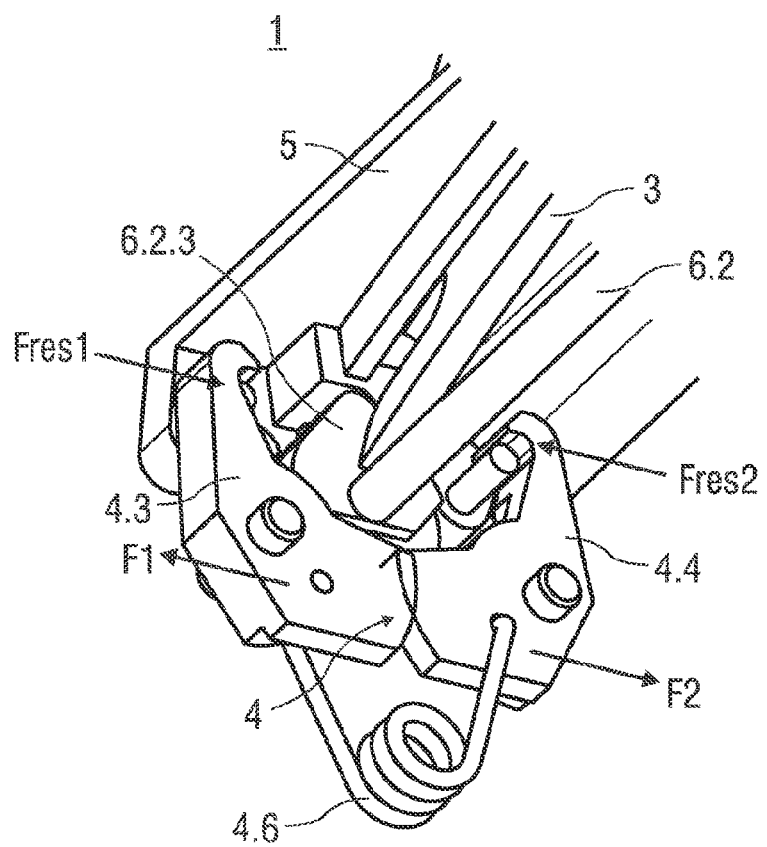
Figure 5:
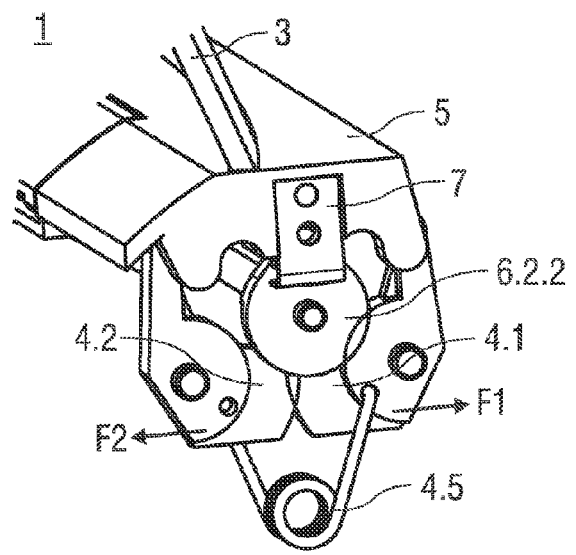
Figure 6:
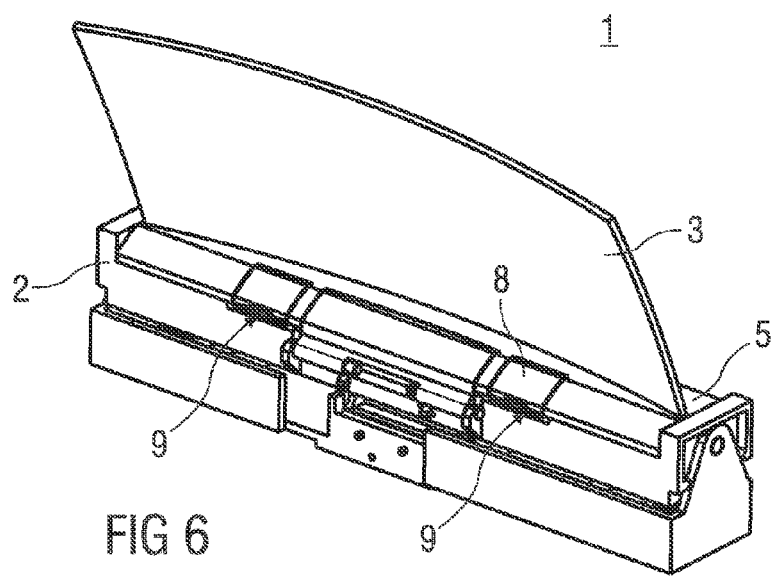

In the following text, exemplary embodiments of the invention will be explained in greater detail using drawings, in which:

FIG. 1 diagrammatically shows a display unit according to the invention for a head-up display in a perspective view, FIG. 2 diagrammatically shows a second perspective view of the display unit according to FIG. 1, FIG. 3 diagrammatically shows a first detailed illustration of a holder of a projection screen of the display unit according to FIG. 1 and of an actuating apparatus for releasing the holder, FIG. 4 diagrammatically shows a second detailed illustration of the holder and of the actuating apparatus according to FIG. 3, FIG. 5 diagrammatically shows a detail of the display unit according to FIG. 1 in the region of a carrier element, and FIG. 6 diagrammatically shows a display unit according to the invention for a head-up display in a perspective view with open flaps.

DETAILED DESCRIPTION

Parts which correspond to one another are provided with the same designations in all the figures.

FIGS. 1 to 5 show a display unit 1 according to the invention for a head-up display in different views. The display unit 1 comprises a carrier element 2, to which a projection screen 3 is fastened. The projection screen 3 is preferably mounted and arranged such that it can be pivoted about a horizontally running axis of inclination.

The carrier element 2 is fastened in or on a dashboard of a vehicle, in particular in a way which is not shown in greater detail. Here, the projection screen 3 is configured in such a way that it is always situated above the dashboard in a field of vision of the vehicle driver. As an alternative, the projection screen 3 can be moved completely in a way which is not shown in greater detail, that is to say, in particular, can be retracted into a cavity within the dashboard below the surface of the latter and can be extended out of said cavity if use is desired.

A holder 4 is provided for fastening the projection screen 3, which holder 4 has, at the ends of the carrier element 2, in each case two hook elements 4.1, 4.2 and 4.3, 4.4 which can be pivoted with respect to one another. The hook elements 4.1, 4.2 and 4.3, 4.4 are preferably configured as identical parts, which results in particularly inexpensive production of the holder 4.

The hook elements 4.1, 4.2 and 4.3, 4.4 in each case have a fastening pin, by means of which said hook elements 4.1, 4.2 and 4.3, 4.4 engage in each case into a cutout, corresponding to said fastening pin, within the carrier element 2. Here, the fastening pins and the cutouts are configured in such a way that a rotation of the hook elements 4.1, 4.2 and 4.3, 4.4 relative to the carrier element 2 is possible.

In order to realize the fastening of the projection screen 3 to the carrier element 2, the projection screen 3 is fastened on the lower longitudinal side to a base element 5.

On both end sides, the base element 5 has holding pins 5.1, 5.2 which correspond to the hook elements 4.1, 4.2 and 4.3, 4.4, a total of four holding pins 5.1, 5.2, merely two holding pins 5.1, 5.2 being shown.

In the closed state, the hook elements 4.1, 4.2 and 4.3, 4.4 engage around the holding pins 5.1, 5.2 and the base element 5 is supported on the upper side of the carrier element 2. In order to avoid self-actuating opening of the hook elements 4.1, 4.2 and 4.3, 4.4, the hook elements 4.1, 4.2 and 4.3, 4.4 of in each case one side are coupled to one another by way of a spring element 4.5, 4.6.

The spring elements 4.5, 4.6 are configured in each case as helical springs, the spring elements 4.5, 4.6 being connected to the hook elements 4.1, 4.2 and 4.3, 4.4 in such a way that spring forces F1, F2 act in the lower region of the hook elements 4.1, 4.2 and 4.3, 4.4 to the outside, in each case in the opposite direction. On account of the rotatable mounting of the hook elements 4.1, 4.2 and 4.3, 4.4 in the carrier element 2, a resulting force Fres1, Fres2 which acts to the inside and presses the hook elements 4.1, 4.2 and 4.3, 4.4 against the holding pins 5.1, 5.2 is produced in each case in the region of the connection of the hook elements 4.1, 4.2 and 4.3, 4.4 to the holding pins 5.1, 5.2.

A reliable hold of the projection screen 3 on the carrier element 2 can be realized in this way, with the result that the projection screen 3 is protected against jolts, vibrations and oscillations during the operation of the vehicle.

An actuating apparatus 6 is provided to make it possible to release the projection screen 3 from the carrier element 2. The actuating apparatus 6 comprises an operating unit 6.1 which is configured as an actuating button and is fastened pivotably to the carrier element 2. Furthermore, the actuating apparatus 6 comprises a shaft 6.2 which extends over the entire length within the carrier element 2 and is mounted on the end side in each case rotatably in cutouts in the carrier element 2 which correspond with the shaft 6.2.

In order to release the projection screen 3 from the carrier element 2, the operating unit 6.1 and the shaft 6.2 in each case have journals 6.1.1, 6.2.1 which are operatively connected to one another, the shaft 6.2 being rotated when the operating unit 6.1 is pressed. In order to make it possible to press the operating unit 6.1, the base element 5 has a cutout which corresponds to the operating unit 6.1 in the region of said operating unit 6.1.

Furthermore, the shaft 6.2 in each case has an actuating element 6.2.2, 6.2.3 at its two ends. Said actuating elements 6.2.2, 6.2.3 are in each case coupled to the hook elements 4.1, 4.2 and 4.3, 4.4 in such a way that, upon actuation of the operating unit 6.1 and a resulting rotation of the shaft 6.2, a force is generated which counteracts the resulting forces Fres1, Fres2, with the result that the hook elements 4.1, 4.2 and 4.3, 4.4 move to the outside in the region of the holding pins 5.1, 5.2 and release the latter.

Furthermore, the actuating elements 6.2.2, 6.2.3 are operatively connected to the base element 5 and engage on an underside of the base element 5 into guides which are arranged there. The actuating elements 6.2.2, 6.2.3 have a greater diameter in the lower region than in the upper region, with the result that they are formed in an egg-shaped manner. On account of this shape and the arrangement of the actuating elements 6.2.2, 6.2.3 in the guides, the base element 5 with the projection screen 3 fastened therein is moved upward out of the carrier element 2 during the rotation of the shaft 6.2. This movement takes place after the holding pins 5.1, 5.2 are released by the hook elements 4.1, 4.2 and 4.3, 4.4. The projection screen 3 together with the base element 5 can therefore be removed from the carrier element 2 in a simple way and free from damage.

In addition to the easy release of the projection screen 3 from the carrier element 2, it is particularly advantageous that the optical surface of the projection screen 3 is not deformed during release because the base element 5 remains on said projection screen 3.

In order to avoid sudden release of the base element 5 from the carrier element 2 and therefore damage of the projection screen 3, for example by falling down, spring elements 7 are additionally arranged at both ends of the carrier element 2, only one of the spring elements 7 being shown. The spring elements 7 connect the base element 5 to the carrier element 2 in such a way that unwanted sudden release of the base element 5 from the carrier element 2 is avoided.

FIG. 6 diagrammatically shows a display unit 1 according to the invention for a head-up display in a perspective view with open flaps 9.

In each case one opening 8 which can be closed in each case by means of a pivotable flap 9 is particularly advantageously arranged on both sides of a cutout for the operating unit 6.1 in the base element 5. Here, the opening 8 and the flap 9 are of corresponding configuration, with the result that the opening 8 is covered when the flap 6 is closed in a flush manner with respect to the surrounding surface of the base element 5. As a result, a vehicle user can reach with one or more fingers into the openings 8 and reliably grip and hold the base element 5 and the projection screen 3. Here, direct contact of the projection screen 3 by the vehicle user during the mounting and resulting damage and/or soiling can advantageously be avoided.

The invention claimed is:

1. A display unit comprising a projection screen for a head-up display, wherein the projection screen is coupled mechanically to a base element which is connected releasably to a carrier element and/or a holder, and the holder comprises two hook elements that are positioned at opposite ends of the carrier element and are pivotable with respect to one another;
    wherein the two hook elements are coupled to one another by a spring element, wherein the spring element comprises a helical spring to establish a spring force configured to drive a hook portion of each hook element into engagement with a respective holding pin of the base element.

2. The display unit as claimed in claim 1, wherein a positively locking and/or nonpositive connection between the holder and the base element is releasable without tools.

3. The display unit as claimed in claim 1, comprising an actuating apparatus arranged in the carrier element and configured to release the connection between the holder and the base element.

4. The display unit as claimed in claim 3, wherein the actuating apparatus comprises an operating unit and a shaft, the operating unit being fastened pivotably to the carrier element, and the shaft extending over an entire length of the carrier element and being mounted on end sides in a pivotable or rotatable manner in cutouts in the carrier element which correspond to the shaft.

5. The display unit as claimed in claim 4, wherein an actuating element is arranged on the shaft, and the actuating element is operatively connected to the hook elements in such a way that rotation of the actuating element brings about pivoting movement of the hook elements.

6. The display unit as claimed in claim 5, wherein the actuating element is operatively connected to the base element and configured to engage into guides on an underside of the base element, wherein upon release of a positively locking and/or nonpositive connection between the hook elements and the holding pins of the base element, the base element is movable upward out of the carrier element.

7. The display unit as claimed in claim 4, comprising openings on sides of a cutout in the base element for the operating unit, the openings being closable by pivotable flaps.

8. The display unit as claimed in claim 1, wherein the hook elements are substantially identical.

9. The display unit as claimed in claim 1, wherein each of the hook elements comprises a fastening pin configured as a rotational pin which is configured to couple each respective hook element to the carrier element within a cutout of the carrier element.

10. The display unit as claimed in claim 1, wherein the holding pins of the base element are positioned proximate to the ends of the carrier element and correspond to respective hook elements.

11. The display unit as claimed in claim 10, wherein the hook elements engage around the respective holding pins in a closed state, the base element being supported on an upper side of the carrier element.

12. A display unit comprising:
    a projection screen for a head-up display, wherein the projection screen is coupled mechanically to a base element which is connected releasably to a carrier element and/or a holder, and the holder comprises two hook elements that are positioned at opposite ends of the carrier element and are pivotable with respect to one another; and
    an actuating apparatus arranged in the carrier element and configured to release the connection between the holder and the base element, wherein the actuating apparatus comprises an operating unit and a shaft, the operating unit being fastened pivotably to the carrier element, and the shaft extending over an entire length of the carrier element and being mounted on end sides in a pivotable or rotatable manner in cutouts in the carrier element which correspond to the shaft.

13. The display unit as claimed in claim 12, wherein a positively locking and/or nonpositive connection between the holder and the base element is releasable without tools.

14. The display unit as claimed in claim 12, wherein an actuating element is arranged on the shaft, and the actuating element is operatively connected to the hook elements in such a way that rotation of the actuating element brings about pivoting movement of the hook elements.

15. The display unit as claimed in claim 14, wherein the actuating element is operatively connected to the base element and configured to engage into guides on an underside of the base element, wherein upon release of a positively locking and/or nonpositive connection between the hook elements and holding pins of the base element, the base element is movable upward out of the carrier element.

16. The display unit as claimed in claim 12, wherein the hook elements are substantially identical.

17. The display unit as claimed in claim 12, wherein each of the hook elements comprises a fastening pin configured as a rotational pin which is configured to couple each respective hook element to the carrier element within a cutout of the carrier element.

18. The display unit as claimed in claim 12, wherein the base element comprises holding pins that are positioned proximate to the opposite ends of the carrier element and correspond to respective hook elements.

19. The display unit as claimed in claim 12, comprising openings on sides of a cutout in the base element for the operating unit, the openings being closable by pivotable flaps.

* * * * *